United States Patent

[11] 3,613,850

| [72] | Inventor | Henry Troeger<br>Cooperstown, N.Y. |
|---|---|---|
| [21] | Appl. No. | 853,021 |
| [22] | Filed | Aug. 26, 1969 |
| [73] | Assignee | The Bendix Corporation<br>Utica, N.Y. |

[54] CENTRIFUGAL AND TORQUE RESPONSIVE CLUTCH
7 Claims, 4 Drawing Figs.

[52] U.S. Cl. ................................................. 192/105
      CP, 192/41 R, 192/54, 192/109 B
[51] Int. Cl. ......................................... F16d 43/06
[50] Field of Search ........................................ 192/54, 103
      A, 105 C, 41, 105 CP, 105 B, 109

[56] References Cited
UNITED STATES PATENTS

| 1,841,284 | 1/1932 | Gillett | 192/103 A |
| 1,881,941 | 10/1932 | Putney | 192/105 CP |
| 1,987,833 | 1/1935 | Lansing | 192/103 A |
| 2,122,218 | 6/1938 | Sneed | 192/105 CP X |
| 2,419,890 | 4/1947 | Freeborn | 192/105 CP |
| 2,721,639 | 10/1955 | Miller | 192/105 B X |
| 3,160,252 | 12/1964 | Steinlein | 192/103 A X |

*Primary Examiner*—Benjamin W. Wyche
*Attorneys*—Robert A. Benziger and Plante, Arens, Hartz, Hix and Smith ABSTRACT: A self-energizing torque limiting, governor-controlled disk clutch is disclosed herein. The clutch is an actuating member which advances on a helical spline to compress a disk pack in response to the speed-sensitive governor. Initial contact between the actuating member and the disk-pack member causes the actuating member to fully advance and lock into engagement with the disk pack. Means are provided to permit counterrotation of the disk pack when the rotational speed of the clutch output member exceeds the speed of the clutch input member so that the actuating member can begin to retract the helical spline thereby lowering the disk-pack compression force without requiring slippage of the disk pack.

HENRY TROEGER
INVENTOR.

HENRY TROEGER
INVENTOR.

BY Robert A. Benziger

CENTRIFUGAL AND TORQUE RESPONSIVE CLUTCH

BACKGROUND OF THE INVENTION

In the usage of turbine engines in aircraft, it has become a common practice to employ small turbine auxiliary power units (APU) to act as starters for the main turbines and to provide a source of electrical power for various instruments and lights while the main turbines are shut down. The starter unit is coupled to the main engine by a clutch. The clutch must be sensitive to rotational speed so that the APU and the main engine remain disconnected until the rotational speed of the APU is sufficiently high to start the main engine while overcoming the high drag of the main engine. The clutch must also be able to dissipate the energy of torque transmitted at the input-output speed differential until synchronization is reached. Since a friction clutch can readily dissipate energy, it is an object of this invention to provide a friction clutch which is speed sensitive. Devices of this general type are known and rely upon centrifugal force to act radially against a bias to compress shoes against a hub. These devices are not entirely satisfactory because the centrifugal force is reduced as the load causes the input member to decelerate whereby the torque-transmitting capabilities are reduced. It is an object of this invention to provide a clutch of the aforementioned general type in which the torque-transmitting surfaces are maintained separated until a predetermined input speed is reached but which, having once made contact, remain in a torque-exchanging relationship regardless of the speed of the device until transmitted torque drops to a predetermined low value or is reversed. It is an object of this invention to provide a clutch of the aforementioned general type in which the torque-transmitting capability is not reduced if the APU shows down below the actuating speed. It is a further object of this invention to provide a speed-sensitive friction clutch in which the torque-transmitting capability is substantially constant after initiation. It is a still further object of the present invention to provide a torque-transmitting coupling having speed-sensitive torque transmission initiating means which coupling is thereafter insensitive to the speed of the input device.

The preferred construction of my clutch requires that the governor-controlled actuating plate member advance on a helical spline into initial contact with a friction disk means. Devices are known wherein a clutch (or brake) actuating member is advanced, by inertia and a helical spline, to compress and energize a disk-pack. However, in order to avoid clutch lockup, the actuating member is usually nonrotatable and is compressively energized by a clutch nut through a dentil connection. This, of course, prevents lockup, but also prevents such a combination from being self-energizing. It is, therefore, an object of this invention to provide a friction disk-pack-type clutch which is self-energizing. It is a further object of this invention to provide such a device which is self-energizing to the point of lockup, but which may be readily disengaged. It is a further object of this invention to provide a friction disk pack type of clutch in which the axially traversing actuating member comes into direct contact with one of the friction disks. It is yet another object of the present invention to provide, in a self-energizing disk pack type of clutch, a loosely splined connection between a portion of the disk pack and the clutch input member which connection permits slight counterrotation of the disk pack without slippage within the disk pack.

Clutches used to couple a main engine and an APU into a torque-exchanging relation are also required to release the connection once the main engine has reached its operating speed. It is, therefore, an object of the present invention to provide a speed sensitive friction clutch which is deenergized whenever the transmitted torque drops to a predetermined low value or attempts to be reversed in direction.

I have found that the lockup feature, discussed hereinabove, may be advantageously utilized as a self-energizing feature in a clutch coupling provided that the actuating member is helically splined to a shaft or the like in such a manner that initial contact between the actuating member and the screw shaft reinforces the engagement characteristic of the actuating member. To overcome the resultant lockup and permit clutch disengagement, I have added a novel means for permitting counterrotation of the disk pack at energies substantially below the disk pack slippage energies which counterrotation permits counterrotation of the actuating member to an extent sufficient to reduce the disk pack loading to the level where slippage can readily occur.

SUMMARY OF THE INVENTION

In order to accomplish the foregoing objectives, my clutch is comprised of a torque transmitting friction disk pack interconnecting input and output members and compressed by the screwjack action of an actuating plate member. The initial compressive movement is obtained by centrifugal means which, under the influence of centrifugal force, advances the actuating plate member on a helical spline into contactive engagement with one of the friction disks. The friction disk and actuating plate become locked in a torque-exchanging configuration which, so long as the torque transfer is from input to output, will hold the actuating plate in engagement regardless of the rotational speed of input member.

Release of the disk pack is facilitated by means of a two-segment pressure plate which is loosely splined together with the segments being spring biased, through a thrust washer, to obtain the desired torque characteristic. The thrust washer/pressure plate interface provides a small radius, low friction sliding surface so that disengagement can be achieved while the actuating plate and friction disk means remain locked up. The loosely splined connection between pressure plate segments permits slight relative rotation of the segments thereby avoiding the necessity for slip at the friction interface until after the actuating plate member has been partially withdrawn.

DETAILED DESCRIPTION OF THE PREFERRED EMBODIMENT

Figure 1:
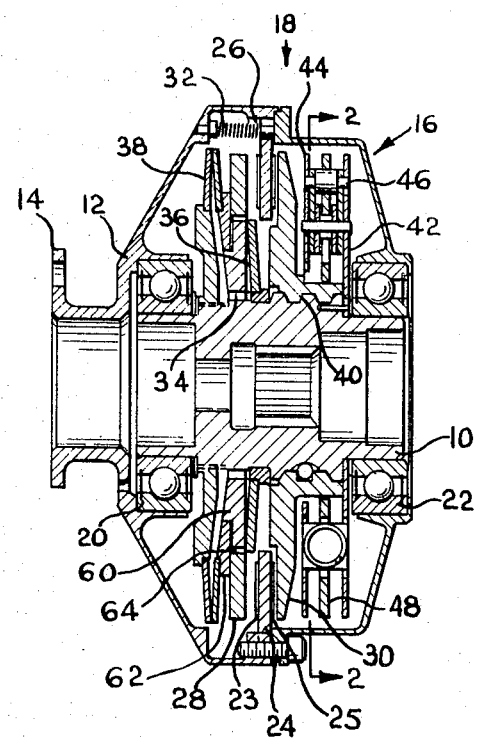
FIG. 1 shows a sectional view of the preferred embodiment of a clutch according to the present invention, in the disengaged mode.

Referring now to FIG. 1, the preferred embodiment of the present invention is illustrated. The clutch is comprised of an input or driving member in the form of hub 10 adapted for attachment to the shaft of a starter motor or engine, not shown, which may be, for instance, an APU and output or driven member in the form of housing 12 adapted as at 14 for attachment to the shaft, not shown, of an engine to be started, also not shown, governor means indicated generally by 16 and torque-exchanging means indicated generally by 18. The output member 12 is supported on the input member 10 by bearing means 20, 22 so as to be rotationally independent of the input means. Control means, such as governor 16, are coupled directly to the input member 10 for rotation therewith while the torque exchanging means interconnects the input member 10 and the output member 12.

The torque-exchanging means 18 is comprised of a driven clutch member 24 which is connected by splines 26 to the output or driven member 12 and driving clutch members 28, 30 which are coupled to the input or driving member 10. Driving clutch member 28 comprises the pressure plate and driving clutch member 30 comprises the actuating member of a disk pack clutch. Clutch member 30 may also be termed advance means since it moves forward on mating helical spline 40 as discussed infra. The driven member 24 is shown as having friction material facings 23, 25 to provide a controllably abradable friction surface for the clutch. Alternatively, these facings may be placed on the driving clutch members 28, 30 or may be included on, or omitted from, all clutch members. Biasing means 32 are operative to urge the driven clutch member 24 away from driving clutch member 28.

Figure 2:
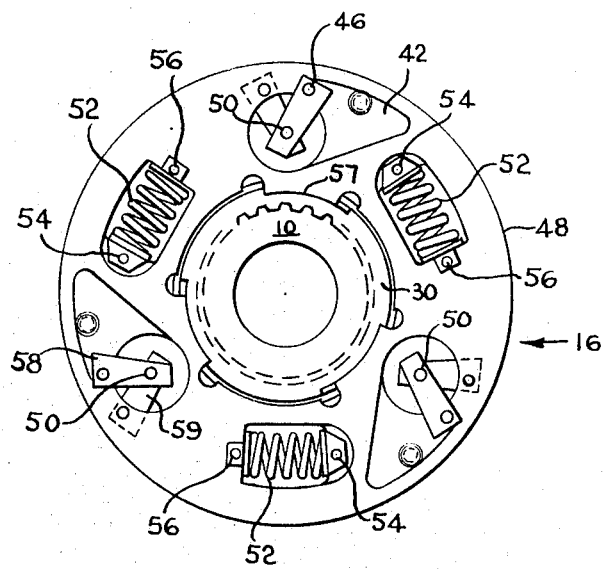
FIG. 2 shows an elevational view of the governor actuating means section of the clutch viewed substantially from and along line 2—2 in FIG. 1.

Referring now to FIGS. 1 and 2 and particularly to FIG. 2, the governor means 16 is illustrated. The governor means 16 is comprised of backing member 42 which is coupled to the driving member 10 for contemporaneous rotation therewith and backing member 44 which is spaced apart from member 42 and connected thereto by suitable means shown here as pins 46. Backing member 44 is arranged to be stationary with respect to backing member 42. Interposed between the backing members 42, 44 is the governor rotary member 48. The rotary member 48 is arranged to execute limited rotary movement with respect to the backing members 42, 44. The rotary member 48 is coupled to the backing members 42, 44 through toggle means 50 and biasing means 52. The biasing means 52 are connected via pins 54 to the backing members 42, 44 and via pins 56 to the rotary member 48. The biasing means are operative to bias the rotary member 48 towards a first position in which the center-of-gravity of the toggle means 50 is at the radially innermost position.

Each toggle means 50 is comprised of coupled link members 58, 59. Link members 58 are connected to the backing members 42, 44 at, for instance, interconnecting pin means 46 and link members 59 are connected to rotary member 48. Upon rotation, the center of gravity of the toggle means 50 will attempt to move radially outward which will tend to force apart the free or noncoupled ends of the toggle means. This will place a compression on the biasing means 52 so that the extent of the radial movement of the center of gravity of the toggle means 50 becomes a controlled function of the rotational speed of the governor means 16 and, hence, the input or driving member 10.

As shown in FIG. 2, the rotary member 48 includes splines 57 which are operative to engage a portion of clutch actuating member 30. The actuating member 30 is coupled to the input or driving means 10 through suitably threaded mating helical splines 40 such that the axial location of actuating member 30 is controlled directly by the relative rotation of rotary member 48 with respect to the backing members 42, 44.

Figure 3:
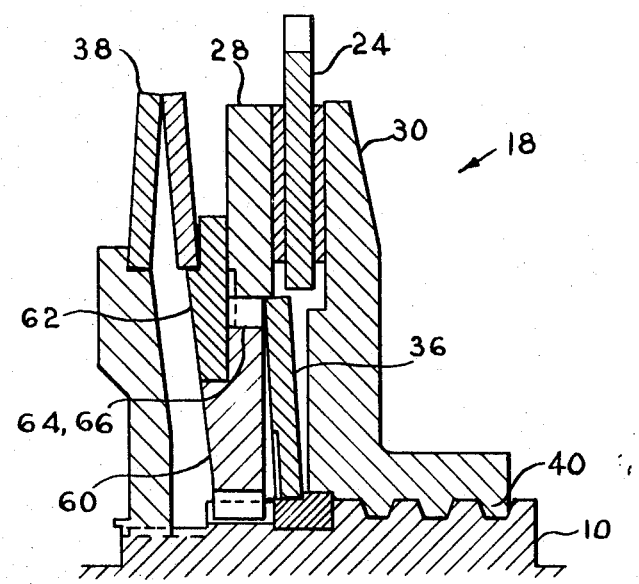
FIG. 3 shows an enlarged sectional view of the torque-exchanging means of the clutch of FIG. 1 in the engaged mode to illustrate the coaction between the driving and coupling members which facilitates clutch release.

Referring now to FIGS. 1 and 3 and particularly to FIG. 3, the coaction of the elements to permit counterrotation of the torque-exchanging means 18 without requiring slippage at the clutch interface is shown. Driving clutch member 28 is coupled to the input or driving member 10 through intermediate coupling member 60. In order to provide a controlled level of torque exchange, resilient means are provided to controllably bias the driving member 28. These means take the form of Belleville springs 36 and 38. Belleville spring 36 biases the intermediate coupling member 60 leftward, relative to the figures, while Belleville springs 38 acting through thrust washer 62 bias both driving member 28 and the intermediate coupling member 60 rightward.

Figure 4:
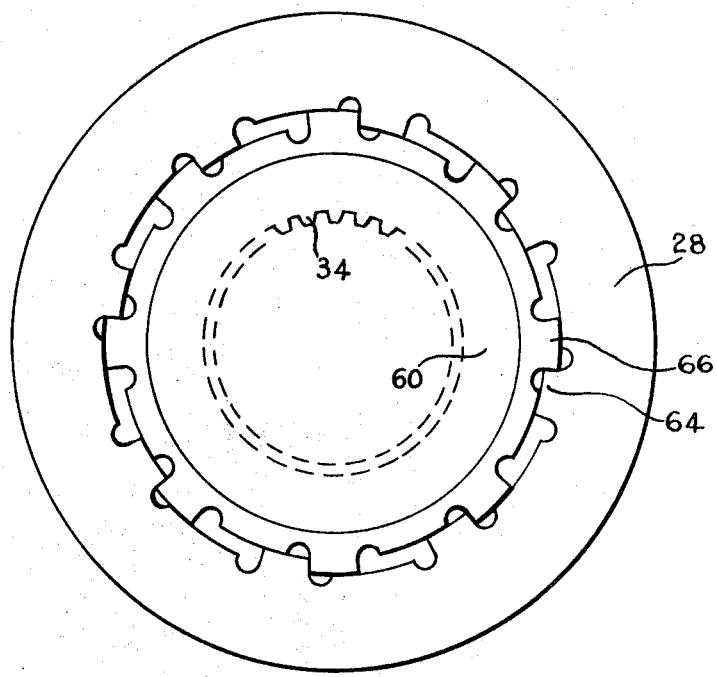
FIG. 4 shows an elevational view of the combined driving and coupling members.

The interconnection between the driving member 28 and the intermediate coupling member 60, which comprises the disengagement means, is illustrated in FIG. 4. The driving clutch plate 28 has splines 64 which mate with suitable splines 66 on the intermediate coupling member 60 to provide a loose connection between the intermediate coupling member 60 and driving clutch member 28. The intermediate coupling member 60 is adapted as by splines 34 to be nonrotationally coupled to the input or driving member 10. This permits a limited amount of rotational freedom of the intermediate coupling member 60 with the "play" taken up and the splines 64, 66 abutting during the driving operational mode.

In situations calling for clutch disengagement, rather than requiring that slippage occur between the clutch members 24, 28, 30, the amount of play between driving clutch member 28 and the intermediate coupling member 60 permits the rotational relationship of these elements to alter. As the driving clutch member 28 rotates relative to the intermediate coupling 60 and the input or driving member 10, the clutch members 24 and 30 are, through the friction connection, caused to rotate slightly with respect to the driving member 10. This causes the actuating member 30 to retract slightly on the helical spline 40 reducing the force and friction levels at the torque exchanging means 18 whereby slippage may occur within the disk pack at reduced friction levels.

The energy required for the clutch members 24, 28, 30 to counterrotate is a function of the friction force at the spline 64, 66 connection and the friction force between the thrust washer 62 and the driving clutch member 28. The component elements can be designed to minimize this force and, hence, the required disengagement energy. Furthermore, since the friction radius of the thrust washer 62 is significantly less than the friction radius of the clutch members 24, 28, 30 slippage energies are further reduced.

OPERATION

When the clutch input or driving member 10 is rotated, the various links of the toggle means 50 develop radial forces which, by the action of the pin connections between the toggle means 50, the backing plate means 42, 44, and the actuating plate means 48, produces a force on the actuating plate 48. At cut-in speed, this force overcomes the force due to the biassing means 52 and causes the actuating plate to rotate with respect to the backing plate 42 and the hub 10. This rotation, through the splines 57 of the actuating plate 48, rotates the helically splined driving clutch plate 30 and causes it to advance into contact with the driven clutch plate 24. Upon contact, the relative rotational directions and the drag torque on the driving clutch plate 30, due to contact, forces the driving clutch plate 30 into tight engagement with the driven clutch plate 24 forcing the driven clutch plate leftward (relative to the figures) into contact with the other driving clutch plate 28. In this manner, the friction disk torque-exchanging means is self-energizing. Belleville spring means 36 and 38 determine the total loading of the friction connection.

When the main engine has attained self-sustaining speed so that the APU may be shut down, torque through the clutch is reversed and the driving clutch plate 30 tends to be unscrewed by the axial force of the various resilient means such as Belleville springs 38 and the springs 52. However, the friction between the clutch plates and the helical splines will tend to inhibit this unscrewing of the actuating plate 30. This would prevent a subsequent APU start because of the maintained coupling of the relatively high inertia load of the main engine. To ensure clutch disengagement under this condition, the clutch must be able to provide some relatively small negative torque.

This is accomplished in the following manner: Belleville springs 38 bear against thrust washer 62 which bears against the splined coupling plate 60 which, in turn, bears against axially fixed Belleville spring or washer 36. The pressure plate 28 is contained freely between thrust washer 62 and Belleville spring 36 and is coupled to the coupling plate 60 by splines 64, 66 which have considerable circumferential clearance to permit the driving clutch plate or pressure plate 28 to rotate freely through some moderate angle with respect to coupling plate 60. The material of thrust washer 62 is selected to have a lower coefficient of friction than the clutch friction surfaces. When driving a high-torque load, the splines 64, 66 will be loaded in one direction. The circumferential clearance between splines 64, 66 provides a limited lost motion connection between driving clutch member 28 and intermediate coupling 60 and the relatively low friction between thrust washer 62 and pressure plate 28 permits the force of the Belleville springs 38 to produce a reverse torque. The driving clutch plate 30 will unscrew on the helical splines 40 until there is a torque balance achieved between the torque transmitted by the very light contact of the friction surfaces and the torque produced by the centrifugal force acting on the toggle link means 50. As the rotational speed of the hub 10 drops, the torque of the springs 52 will overcome the torque produced by centrifugal force acting on the toggle link means 50 and the actuating plate 48 will reset, completing clutch disengagement.

While I have described my invention with respect to a preferred embodiment, the man skilled in the art will recognize that modifications and variations in my clutch may be made without departing from the scope of my invention.

I claim:

1. A torque-exchanging coupling comprising:
    input means;
    output means;
    a first helical spline connected to said input means;
    friction disc means having a plurality of friction members compressible to establish a torque-exchanging connection between said input means and said output means;
    actuating means having a second helical spline advanceable on said first helical spline to contactively engage one of said friction members, said helical splines cooperative upon said contactive engagement to urge said actuating means towards said friction disc means;
    resilient means operative to control the level of torque exchange; and
    disengagement means coupled to said friction disc means operative to permit limited counterrotation of said friction disc means without slippage between adjacent friction members, said disengagement means including an intermediate coupling member loosely splined to one of said friction members and nonrotationally coupled to said input means, and means providing a low friction connection between said resilient means and said one of said friction members.

2. The coupling as claimed in claim 1 including further biasing means operative to maintain said friction disc means in a mutually spaced apart relationship.

3. The coupling as claimed in claim 1 wherein said actuating means comprise advance means connected to one of said friction members operative to urge said member into contact with a second friction member; and
    control means coupled to said advance means to provide for selective advancement of said one of said friction members.

4. The coupling as claimed in claim 3 wherein said control means comprise:
    speed responsive means connected to, and adapted to rotate with, said input means, said speed responsive means including a rotary member connected to said advance means, said rotary member adapted to execute limited rotation with respect to said input means whereby the advance means is rotated with respect to said input means to advance said one of said friction members.

5. The coupling as claimed in claim 4 wherein said speed responsive means includes further:
    biasing means operative to urge said rotary member towards a first rotary position; and
    centrifugal weight means operative to urge said rotary member rotationally away from said first rotary position.

6. A friction clutch comprising:
    axially extending input means;
    output means coaxial with said input means;
    driving clutch means coupled to said input means, said driving clutch means including a pressure plate and an actuating member;
    driven clutch means coupled to said output means and disposed adjacent said driving clutch means for contactive engagement therewith;
    actuating means operative to initiate contactive engagement of said driving and driven clutch means; and
    disengagement means responsive to the transmittal of torque from said input means to said output means below a predetermined level, which disengagement means allows for a reversal of torque between input and output thereby permitting said actuating means to terminate contactive engagement of said driving and driven clutch means, said disengagement means including a coupling member interconnecting said pressure plate and said input means and adapted to rotate with said input means, biasing means operative to bias said pressure plate and said coupling member toward a desired position, and washer means operative to contactively abut said pressure plate and said coupling member for the uniform application of the biasing force.

7. A friction clutch comprising:
    axially extending input means;
    output means coaxial with said input means;
    driving clutch means coupled to said input means;
    driven clutch means coupled to said output means and disposed adjacent said driving clutch means for contactive engagement therewith;
    actuating means operative to initiate contactive engagement of said driving and driven clutch means; and
    disengagement means responsive to the transmittal of torque from said input means to said output means, said disengagement means including means having a loosely splined radially abutting connection between said driving clutch means and said input means, said connection having circumferential clearance between nonabutting splines of said connection, and a low friction axial interconnection therebetween comprised of a washer contactively engaging said driving clutch means.